No. 857,595. PATENTED JUNE 25, 1907.
C. W. CAMPBELL.
COLLAR PAD.
APPLICATION FILED NOV. 30, 1906.

Witnesses
A. E. Reese
E. K. Witman

Inventor
C. W. Campbell
By Julian C. Dowell
his Attorneys

THE NORRIS PETERS CO., WASHINGTON, D. C.

UNITED STATES PATENT OFFICE.

CHARLES WILLIAM CAMPBELL, OF MACON, GEORGIA.

COLLAR-PAD.

No. 857,595.  Specification of Letters Patent.  Patented June 25, 1907.

Application filed November 30, 1906. Serial No. 345,628.

*To all whom it may concern:*

Be it known that I, CHARLES WILLIAM CAMPBELL, a citizen of the United States, residing at Macon, in the county of Bibb and State of Georgia, have invented certain new and useful Improvements in Collar-Pads; and I do hereby declare the following to be a full, clear, and exact description of the invention, such as will enable others skilled in the art to which it appertains to make and use the same.

A collar pad is the pad which is used in or under the upper part of a horse collar to afford a comfortable bearing on the neck of the animal and prevent chafing or bruising.

In a prior application for a patent for an improvement in horse collars, filed by me on the 2nd day of May, 1906, serially numbered 314,835, I have duly set forth an improved construction of and mode of making a collar-pad, the same being also described in this specification. So, much of the subject-matter of the present specification (including Figures 1 to 8 inclusive of the drawings) as is disclosed and set forth in my aforesaid application Serial Number 314,835, is hereby made a division of that application.

Figure 1:
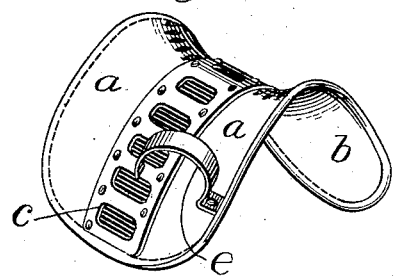

The collar-pad herein referred to is of the rolled form or shape, by which is meant that the saddle-like pad besides being adapted to straddle the horse's neck is also rolled, turned or curved upward, both forwardly and backwardly, in substantially the manner shown in Fig. 1 of the accompanying drawings. The chief purpose of rolling the pad is to adapt it to fit comfortably the trough of the horse's neck. Just behind this low place in the neck are the withers, which are bony, meaning that the bones of the withers are near the skin and hence easily bruised. The neck rising in front by reason of checking up the horse's head is also liable to bring the ridge of the neck in contact with the pad and thereby cause friction and chafing. But by having the pad rolled up in front and back, the chances of bruising, chafing and wearing are materially diminished.

My invention provides an improved construction of and mode of making a pad of such rolled form or shape, the main objects being to provide a pad of this character that will permanently retain its shape and will not flatten out and become distorted when wet and lose its form through usage as in the case of a pressed pad; and to produce the same in a simple and expeditious manner from flat pieces of leather and other material, without the aid of pressing, allowing also the utilization of small scraps of leather, so that the cost of manufacture may be cheapened.

It may be mentioned, furthermore, that my invention is applicable to harness pads in general, but is more especially intended for a collar-pad.

The invention will hereinafter be fully described with reference to the accompanying drawings (hereby made a part of this specification), and will then be more particularly pointed out in the claims following this description.

Figure 2:
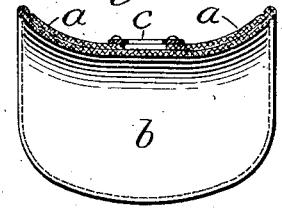
Figure 3:
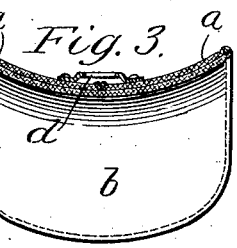
Figure 4:
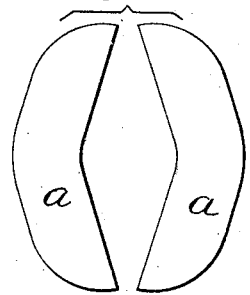
Figure 5:
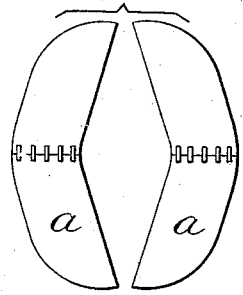
Figure 6:
Figure 7:
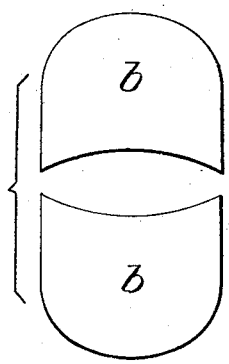
Figure 8:
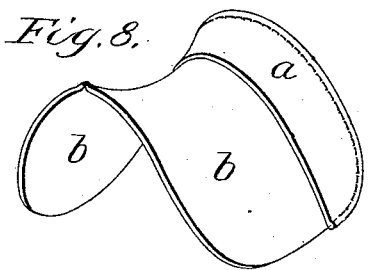
Figure 9:
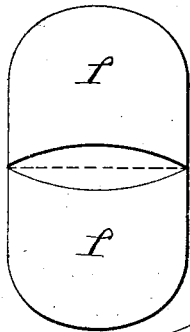
Figure 10:
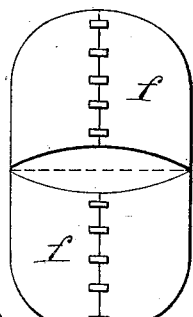
Figure 11:
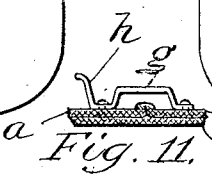

In said drawings, Fig. 1 is a perspective view of one preferred form of collar-pad embodying my invention. Fig. 2 is a central vertical cross-section of the same, taken through the ridge of the pad. Fig. 3 is a view similar to Fig. 2, showing another construction of pad embodying my invention. Fig. 4 is a plan view of the two pieces of leather or other material which make the upper portion of the pad. Fig. 5 is a similar view of such top pieces made by joining together smaller pieces or scraps of material. Fig. 6 is a perspective view of one of the top pieces shown in Fig. 4 or Fig. 5, having the concave edge of such piece held or drawn out in a straight line, thereby causing the material to buckle and its medial portion to roll upwardly at the opposite or convex edge. Fig. 7 is a plan view of the two pieces or half parts which when joined together make the under portion of the pad. Fig. 8 is a perspective view of the under portion of the pad as a whole, together with one of the pieces or half parts of the upper portion of the pad arranged in proper relation thereto. Fig. 9 is a plan view of two half pieces of a different form for making the top portion of the pad. Fig. 10 is a view similar to Fig. 9, showing the respective pieces composed of smaller parts or scraps joined together. Fig. 11 is a fragmentary section through the ridge of a pad having an attachment secured thereto.

For the sake of clearness, and to facilitate the explanation, the following relative terms are herein employed: The "length" of the pad means the length from end to end transversely of the ridge or across the horse's neck; the "ridge" signifies the highest central part of the pad between its said ends, which rests upon the top or ridge of the horse's neck; the "sides" denote the parts of the pad at each side of the ridge; the "front" and "back" of the pad are the opposite longitudinal edges of the pad transversely of the ridge; the "middle" of the pad denotes the medial portion between its front and back.

As shown in Fig. 1 of the drawings, the pad is shaped saddle-like to straddle the horse's neck, and its ridge is curled or rolled up at the front and back, the rolled form extending substantially the full length of the pad, though more pronounced at the ridge; which effect is gained by the mode of cutting and securing together the several parts or pieces of leather or other material of which the pad is composed. While the pad, and especially its upper portion, is preferably made of leather, it will be understood that other materials may be used, such as cloth, felt or other suitable material. Also, it may or may not be desirable to line the pad, and for a lining any suitable material such as cloth, felt or the like may be employed.

Referring to Figs. 1 to 8 inclusive, the upper portion of the pad comprises two crescent-like pieces $a\ a$, constituting the front and back half parts of said upper portion, and extending the full length of the pad and joined together at the middle. These pieces $a\ a$ may be integral, as shown in Fig. 4, or each may be composed of smaller pieces or scraps of leather secured together, as represented in Fig. 5. To form the pad, said pieces $a\ a$ are arranged with their concave edges inwardly or confronting, as shown in Figs. 4 and 5, and such edges are joined or connected at the middle of the pad along a line or parallel lines substantially straight when seen in plan view, the result of which is to cause the pad to roll up at front and back, in the manner illustrated in Figs. 1, 2 and 3. This effect is the inevitable consequence of the mode of cutting and securing together the parts $a\ a$, because it is obvious that if one of the pieces $a$ be held with its concave or inner edge straight, as shown in Fig. 6, the material is caused to buckle and roll forwardly toward its outer or convex edge, more markedly at its medial portion. Hence by bringing two of such pieces together and securing their concave edges at substantially a straight line the desired effect is accomplished. In the completed article, the pad being made saddle-like to straddle the horse's neck, the line of juncture of the two pieces $a\ a$ is of course bowed; for which reason I have above explained that the juncture is along a line or lines substantially straight when seen in plan view. The upper portion of the pad, made by joining the pieces $a\ a$ as explained, constitutes in itself a pad which according to its uses may or may not require the addition of an under portion or lining and such upper portion I claim as a pad *per se*, within the scope of my invention; although, in the completed article I prefer to add the under portion or other parts as hereinafter described. The under portion of the pad comprises two half pieces $b\ b$, of a size and shape approximately conforming to the size and shape of the opposite sides of the pad itself; or in other words these half pieces $b\ b$ constitute the sides of the under portion at opposite sides of the ridge. These pieces $b\ b$ may also be integral, or they may be formed by joining together smaller pieces or scraps, in the same manner as pieces $a\ a$. Said pieces $b\ b$ are formed with inner concave edges, as shown in Fig. 7, and the said pieces are placed one upon another and the edges thereof are joined together, making a curved central seam at the ridge portion of the pad, as shown in Fig. 8; the line of juncture of pieces $b\ b$ being transversely of the line of juncture of pieces $a\ a$.

In making the pad, the crescent-like top pieces $a\ a$ are joined together as explained, so as to produce the rolling effect; and the outer edges of such top pieces are then stitched or otherwise secured to the outer edges of the under pieces $b\ b$, the latter having been previously stitched or otherwise joined together as before specified; and thus the outer edges of the upper portion and lower portion of the pad are stitched or joined all around. Or the under pieces $b\ b$ may be stitched together to produce the saddle-like article shown in Fig. 8, and the top pieces $a\ a$ may then be separately stitched thereto and afterward joined together along a bowed line or lines in a vertical plane. Fig. 8 represents only one of the top pieces $a$ in connection with the under pieces $b\ b$, showing how the upper piece conforms to the under portion of the pad. The several parts $a\ a$ and $b\ b$ are of course so made that in the assembled article the upper portion of the pad fits the lower portion, and the outer edges of the upper and under portion can be stitched together, without crinkling or buckling the material, leaving smooth upper and under surfaces. This result would be gained if the several parts were cut out according to the pattern shown in Figs. 4 and 7, or substantially according thereto; though it is to be understood that I do not restrict myself to these precise forms, since more or less variation may be made according to the size, relative proportions and particular shape of the pad desired. The pad thus produced is a stiff article of the desired form, held in such form by the shape and mode of joining its several parts, so that the article will permanently retain its shape. In fact, a pad thus constructed cannot be stamped, pressed or otherwise distorted out of its desired shape but will hold the same perfectly; and will not flatten out or in any wise lose its form by becoming wet.

Where the parts of the pad are composed of smaller pieces or scraps secured together, it will be understood that any suitable securing means may be used, such as stitching, staples, loops or hooks; and the same or any other suitable means may be employed for securing the different parts $a$ $a$ and $b$ $b$ together. It is preferable however to stitch the parts $b$ $b$ together, and also to stitch the upper and lower portions of the pad together around their outer edges. As aforesaid, a packing or lining may be interposed between the upper and lower portions of the pad if desired. For further stiffening and insuring the form of the pad, in cases where more or less limp material is employed, or even when the pad is made of leather when desired, I provide a metal stiffening strap at the center of the pad and extending preferably from end to end thereof. This strap, which may be a strip of sheet-metal, is denoted by the letter $c$ in Figs. 1 and 2. The strap serves as a means for uniting or joining the adjacent edges of the top pieces or parts $a$ $a$, which are secured to said strap, or preferably to or under its longitudinal edges, in any suitable manner, and by means of rivets, staples or prongs cut from the metal of the strap itself and clenched in or to the interior of the pad. In the form shown in Fig. 1, the stiffening strap $c$ is provided with a series of holes adapted for engagement by fastening devices or catches carried by the points of a separable collar, as set forth in the specification of my aforesaid application Serial Number 314,835; the strap in this instance being designed for a further function in addition to strengthening and stiffening the pad.

In Fig. 2, the adjacent or inner edges of the top pieces $a$ $a$ are shown separated, being riveted or otherwise joined to the edges of the strap $c$, leaving a space along the middle of the pad under the holes or perforations in the metal strap, leaving room for the aforesaid fastening devices or catches to pass through said holes in the strap and engage thereunder. In Fig. 3, the adjacent edges of the parts $a$ $a$ are shown brought together and the strap, denoted in this figure by the letter $d$, is secured to the upper portion of the pad and is upset above the surface thereof to raise the holes or perforations of the strap above the surface of the pad. It is understood that my invention is not essentially restricted to the use of such strap $c$ or $d$, since the adjacent edges of the parts $a$ $a$ may be otherwise secured together, though the strap affords a very effective mode of uniting the pieces $a$ $a$, besides strengthening and stiffening the pad, and is therefore claimed as a further part of my improvement.

In Fig. 1, the pad is shown with a spring $e$, attached to the pad and arranged to engage the rim of the collar in or under which the pad is fitted. This spring serves as a clip for holding the pad in place, or in proper relation to the collar; also for preventing the pad from becoming detached from the collar when the latter is taken off the horse's neck.

Instead of the crescent-like top pieces $a$ $a$ having concave edges joined together along the medial line or portion of the pad, the upper portion of the pad may be formed in another manner. In this connection I show in Fig. 9 two parts or pieces $f f$, corresponding in size and shape to the opposite sides of the pad, and having concave adjacent edges somewhat similar to the pieces $b$ of the under portion of the pad. By bringing the adjacent edges of the pieces $f$ together and securing them at the dotted line, the same rolled effect is obtained. In Fig. 10, I have represented the pieces $f$ as formed of smaller fragments or scraps joined together. The article or upper portion formed by uniting the pieces $f f$ may be used on or upon the under portion $b$ $b$ already described.

It will be observed that the essential distinction between the mode of construction explained with reference to Figs. 4 and 5, and the mode of construction explained with reference to Figs. 9 and 10, is that in the former case the half parts $a$ $a$ extend the length of the pad and are joined at the middle transversely of the ridge; whereas in the latter case the half parts $f f$ correspond to opposite sides of the pad and are joined at or along the ridge. However, both constructions and modes of making embody the same generic principle of my invention, since in both cases the opposed half parts of material, $a$ $a$ or $f f$ as the case may be, are cut out or formed with adjacent concave edges, which edges are brought together and joined at an intermediate line, or in substantially an intermediate plane which is transverse to the surfaces of both parts of the material, in such manner as to straighten out or destroy the original curvature; though with respect to Figs. 4 and 5 the plane of the juncture is transverse of the ridge of the pad, while in Figs. 9 and 10 the plane of the juncture is substantially coincident with the ridge of the pad.

As an adjunct or attachment, a metal strap may or may not be used at the top of the pad in the form shown in Fig. 11, where $g$ designates said strap shaped to provide a strap-loop for the collar strap to pass through or under and buckle; said strap $g$ having a hook-like extension $h$ providing a socket to hold the hame-strap and prevent the hames slipping forward out of the collar, so that by this little device the hames, collar and pad are all held together.

It will be understood that variations may be made in the details of construction without departing from the spirit and scope of my invention.

In the following claims, the term "half-parts" will be used to denote the two half-parts whose concave edges are brought together and secured in such manner as to straighten out the original curvature, in order to produce the aforesaid rolled effect, it being understood however that each or both of these half-parts may consist either of integral pieces or they may be composed of a number of smaller pieces or scraps joined together.

What I claim as my invention and desire to secure by Letters Patent of the United States is:

1. A saddle-like pad having its front and back rolled upward, the same comprising an under portion and an upper portion secured together around their outer edges, the under portion consisting of two half-parts having adjacent edges joined in a concave seam at the ridge, and the upper portion consisting of two opposed half-parts having confronting edges formed concave and joined at an intermediate line in such manner as to straighten out or destroy their original curvature, the said upper portion when so formed conforming to or fitting the under portion.

2. A saddle-like pad having its front and back rolled upward, the same comprising an under portion and an upper portion secured together around their outer edges, the under portion consisting of two half-parts having adjacent edges joined in a concave seam at the ridge, and the upper portion consisting of two crescent-like half-parts arranged transversely of the ridge and joined at the middle in such manner as to straighten out the original curvature of their inner concave edges.

In testimony whereof I affix my signature, in presence of two witnesses.

CHARLES WILLIAM CAMPBELL.

Witnesses:
L. D. MOORE,
W. G. SMITH.